United States Patent
Shapiro et al.

(10) Patent No.: US 6,327,869 B1
(45) Date of Patent: Dec. 11, 2001

(54) ICEMAKER DOSE DISPENSER

(75) Inventors: Andrew Philip Shapiro; Jerome Johnson Tiemann, both of Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/664,123

(22) Filed: Sep. 18, 2000

Related U.S. Application Data

(60) Provisional application No. 60/158,635, filed on Oct. 8, 1999.

(51) Int. Cl.[7] ........................................... F25C 1/00
(52) U.S. Cl. .................. 62/347; 62/74; 141/114; 141/313; 222/253; 222/386.5
(58) Field of Search ................... 62/74, 347; 417/395; 222/253, 386.5; 141/114, 313

(56) References Cited

U.S. PATENT DOCUMENTS

| | | | | |
|---|---|---|---|---|
| 4,147,278 | * | 4/1979 | Uhlig | 222/386.5 |
| 6,016,841 | * | 1/2000 | Larsen | 138/30 |
| 6,152,705 | * | 11/2000 | Kennedy et al. | 417/395 |

* cited by examiner

Primary Examiner—William Doerrler
Assistant Examiner—Mohammad M. Ali
(74) Attorney, Agent, or Firm—Patrick K. Patnode; Douglas E. Stoner

(57) ABSTRACT

An icemaker dose dispenser includes a housing with a septum therein defining opposite chambers having corresponding water ports. Water is routed alternately through the ports for dispensing water from the chambers in sequence for accurately filling an ice tray.

21 Claims, 5 Drawing Sheets

US 6,327,869 B1

ICEMAKER DOSE DISPENSER

This application claims the benefit of U.S. Provisional Application 60/158,635, filed Oct. 18, 1999.

BACKGROUND OF THE INVENTION

The present invention relates generally to refrigerators, and, more specifically, to icemakers therein.

A typical refrigerator includes a cool compartment for keeping cool frozen food and beverage products, and a freezer compartment for storing frozen products.

A common feature located in modern refrigerators is an automatic icemaker built into the freezer compartment. The icemaker includes an ice tray having several compartments in which individual ice cubes are formed. The frozen ice cubes are mechanically dispensed from the ice tray into an ice bin from which the ice may be conveniently dispensed through a chute and outlet typically formed in the freezer door.

The empty ice tray is then refilled with water for the next batch of ice cubes. This is automatically done by the timed opening of a solenoid-actuated valve.

However, accurately controlling the volume of water delivered to the ice tray by timing water flow is dependent upon water pressure. Timed filling of the ice tray must therefore be selected to accommodate maximum expected water pressure without overfilling the ice tray, which will result in underfilling the ice tray for water pressure levels therebelow.

Furthermore, competitive pricing of icemakers requires simplicity of design, few components, and compact elements for minimizing space requirements within the cabinet of the refrigerator. And, electrically operated components, such as solenoids, should be configured for reducing heat generation therefrom which adversely affects performance of the refrigerator.

Accordingly, it is desired to provide an improved dispenser for accurately filling icemaker trays without regard to variation in water pressure.

BRIEF SUMMARY OF THE INVENTION

An icemaker dose dispenser includes a housing with a septum therein defining opposite chambers having corresponding water ports. Water is routed alternately through the ports for dispensing water from the chambers in sequence for accurately filling an ice tray.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
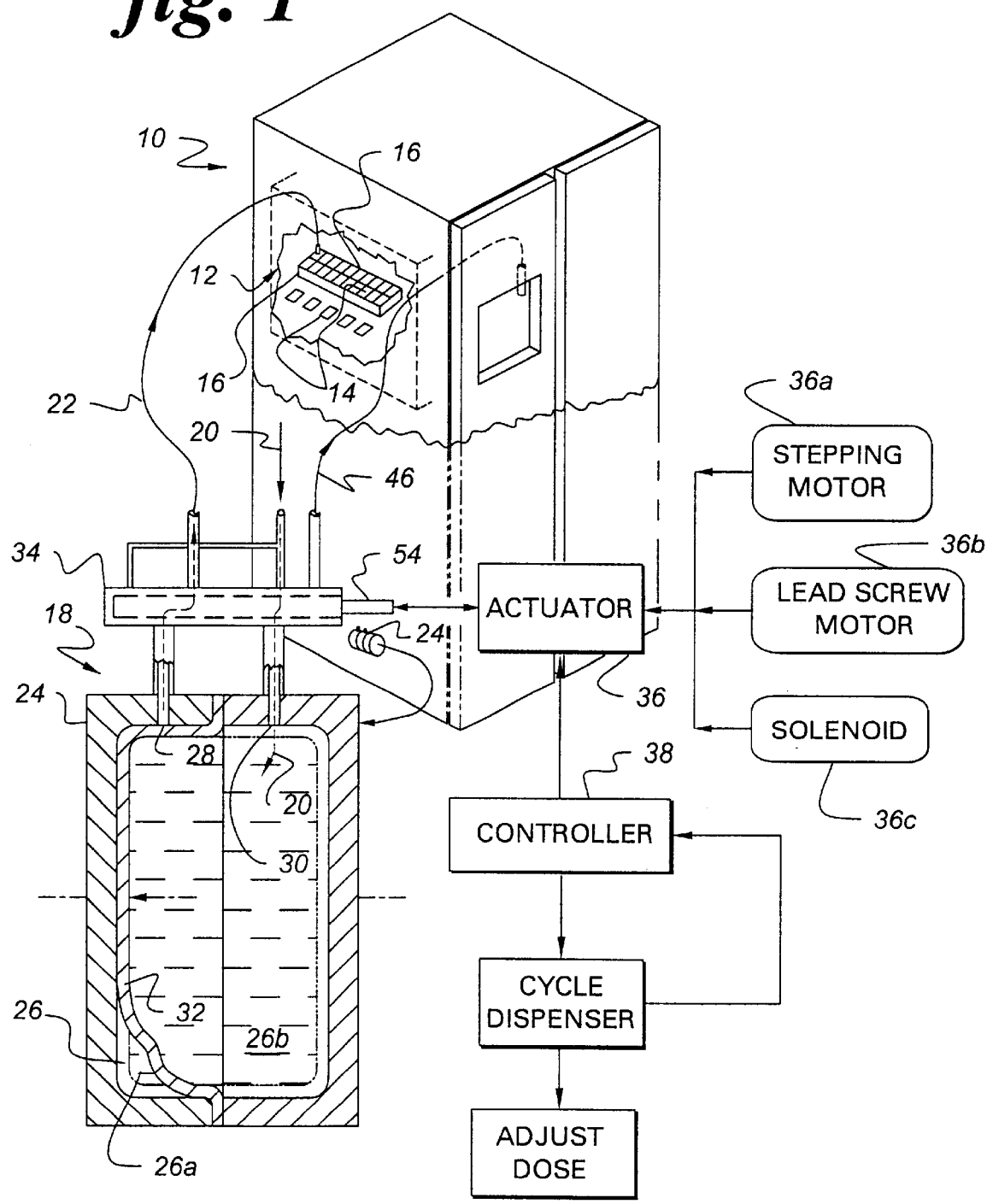
FIG. 1 is a partly sectional, exploded view of a portion of an exemplary refrigerator having an icemaker dose dispenser in accordance with an exemplary embodiment of the present invention, and a corresponding flowchart for controlling operation thereof.

Illustrated in relevant part in FIG. 1 is an exemplary refrigerator 10 including a conventional refrigeration system therein for removing heat from articles stored therein. In the exemplary side-by-side configuration, the refrigerator includes a refrigerator or cool compartment behind the right door for maintaining food and beverages below room temperature, but above freezing.

Disposed behind the left door of the refrigerator is a freezer compartment in which frozen articles may be conveniently stored. The refrigeration system includes a compressor, evaporator, and condenser (not shown) sized for removing sufficient heat for maintaining freezing temperatures in the freezer in a conventional manner.

Suitably mounted inside the freezer compartment is an icemaker 12 which may have any conventional configuration for making ice cubes 14 in a corresponding multi-compartment ice tray 16.

In accordance with the present invention, an icemaker dose dispenser 18 receives water 20 from a suitable water supply or pipe connected to the refrigerator in a conventional manner, and accurately dispenses precise doses of the water through a dose discharge line or pipe 22 suitably joined in flow communication with the ice tray 16.

The dose dispenser or doser is illustrated in an exemplary embodiment in FIG. 1 and includes a dose housing or water measuring vessel 24 having an internal reservoir 26, and first and second spaced apart access ports 28,30 for channeling the water 20 into and out of the reservoir.

An imperforate septum 32 is disposed in the reservoir between the two ports for sealingly dividing the reservoir into a first or left chamber 26a and a second or right chamber 26b on opposite sides of the septum. The septum is suitably joined to the housing and is movable therein for inversely changing volume of the two chambers 26a,b by reciprocating movement of the septum, which correspondingly varies the volume of the opposite chamber.

Means including an exemplary spool valve 34 are provided for routing the water alternately through the first and second ports 28,30 for dispensing water from the two chambers 26a,b in sequence. The spool valve is configured for alternately supplying the water 20 from the icemaker supply pipe to the two ports 28,30 in turn for correspondingly filling and emptying the two chambers 26a,b correspondingly in turn.

As shown in FIG. 1, the spool valve is positioned for routing supply water into the second chamber 26b which fills the reservoir with water as water in the first chamber 26a is discharged through the first port 28 and routed through the discharge line 22 to the ice tray 16.

The specifically configured dose dispenser 18 illustrated in FIG. 1 may be used in an otherwise conventional icemaker of any configuration for precisely filling the ice tray with a specific and accurate volume of water in a new method. By alternatively supplying water to the two ports 28,30, the corresponding left and right chambers 26a,b are filled with water as the other is emptied by the moving septum 32.

In FIG. 1, the spool valve 34 is positioned to deliver the water under normal supply pressure on the right side of the septum 32 to fill the right chamber 26b which increases in volume until the septum is displaced left in the housing and abuts the inner surface of the housing defining the left side of the reservoir. As the septum moves left in FIG. 1, the water in the left chamber 26a is displaced by the moving septum and is discharged through the first port 28 and routed through the spool valve to the discharge line 22. In this way, the water originally found in the left chamber 26a is emptied therefrom by movement of the septum as the right chamber is filled, with the water emptied from the left chamber being channeled into the ice tray 16.

In the next cycle of operation of the dose dispenser, the spool valve 34 is repositioned so that water enters the first port 28 to re-fill the first chamber 26a which displaces the septum to the right for emptying the right chamber 26b, with the water therefrom being routed into the common discharge line 22.

In this way, by alternately filling and emptying the two chambers 26a,b defined on opposite sides of the septum 32, the fixed or constant volume inside the reservoir 26 may be used for precisely metering water to the ice tray 16 independent of water pressure. The reservoir 26 provides a fixed volume of water in each cycle of movement of the septum for precisely filling the ice tray 16.

As shown in FIG. 1, the spool valve 34 is operatively connected to a suitable actuator 36 for controlling its operation and switching between the various flow routing paths therethrough. The actuator is operatively joined to a suitable controller 38 which energizes the actuator to control operation of the spool valves. The controller may be as simple as one or more switches located in the freezer compartment to cycle on the dispenser 18 when a new dose of water is required in the ice tray, or may be a small electrical controller in analog or digital form as desired.

Although the dose reservoir 26 may be sized sufficiently large to provide a single dose of water to completely fill the ice tray 16, the reservoir and its housing are preferably made relatively small and compact and operated in multiple cycles to fill the ice tray for each batch of ice cubes to be produced. The controller 38 may therefore be suitably programmed to cycle the actuator 36 and spool valve 34 for alternately supplying water to the two ports 28,30 to correspondingly reciprocate the septum in a plurality of cycles to fill the ice tray with water.

The reservoir 26 is correspondingly smaller in volume than the required volume to fill the ice tray, and the spool valve 34 is cycled to repetitively fill and empty the two chambers 26a,b alternately in turn, with the water from the emptying chambers being channeled through the discharge line 22 to fill the ice tray with water after the predetermined or desired number of cycles. In this way the dose dispenser 18 may be relatively small in size yet is operated to repetitively discharge constant volumes or doses of water to the ice tray independent of water pressure.

In the exemplary embodiment illustrated in FIG. 1, the septum 32 is in the form of a flexible membrane which bifurcates the housing 24 in two equal halves. The perimeter of the membrane may be suitably clamped between adjoining flanges of the two housing halves for providing a sealed joint thereat.

The dose housing 24 and reservoir 26 therein are preferably axisymmetrical in annular or tubular form, with the septum 32 preferably being a thin elastic disk of a suitable elastic material, such as silicone rubber with a thickness of about 1.5 mm. The septum may be initially flat or taught when installed in the housing and elastically stretches when either chamber is filled with water. The septum may also be relatively loose when initially installed and is readily displaced either left or right in the housing in the presence of water filling the chambers.

In either embodiment, the function of the septum is to divide the reservoir and provide a water seal therebetween for permitting a fixed or constant volume of water to fill the reservoir in one chamber and then be dispensed to the ice tray when motive water is applied to the back side of the septum which automatically fills the back-side chamber as the front-side chamber is emptied.

In this way, the reservoir 26 is alternately filled with water from one side of the septum which empties the water on the other side of the septum and uses the full volume of the reservoir 26 for accurately dispensing a constant dose of water to the icemaker. Variation in water pressure is irrelevant in accurate water dispensing since dose accuracy is controlled solely by the volume of the reservoir 26 itself which is completely filled with water in each cycle of operation.

The elasticity of the septum, its thickness, and its size or unstretched surface area relative to the surface area of the inner surface of the reservoir permit the septum to readily conform to the inner surface of the reservoir when either chamber is filled with water. In this way, the septum preferably lines the empty chamber in abutment against the inner walls thereof when the opposite chamber is filled with water.

With the septum conforming to the inner surface of the reservoir when it is filled with water, an accurate, full volume dose of water is temporarily stored in the housing for subsequent delivery to the ice tray. And, reaction loads from the water inside the reservoir are transferred through the conforming septum and carried by the supporting housing for substantially reducing or eliminating stress in the septum itself. Such stress free operation of the septum ensures a substantial useful life thereof as it is cycled repetitively for filling the ice tray with water.

The primary component of the means for supplying or routing water through the dose housing 24 to the ice tray 16 includes the spool valve 34 in a preferred embodiment cooperating with the actuator 36 and controller 38. The spool valve 34 is illustrated in more particularity in FIG. 2 in accordance with an exemplary embodiment. It includes a water inlet 40 which is suitably connected to a supply of water under pressure in the refrigerator, and a first or dose outlet 42 suitably joined to the discharge line 22 for supplying the ice tray 16. The spool valve also includes an optional second outlet 44 for dispensing drinking water suitably joined to a water dispenser line or pipe 46, additionally shown in FIG. 1 for providing accessible water in the door of the freezer in a common configuration.

The spool valve also includes first and second routing ports 48,50 suitably joined in flow communication with respective ones of the first and second housing ports 28,30.

Figure 3:
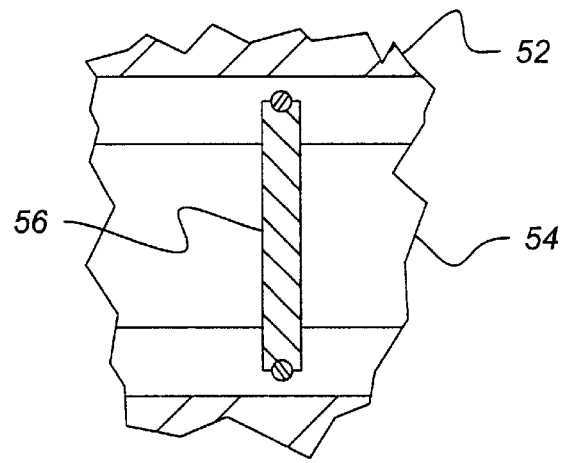
FIG. 3 is an enlarged view of an exemplary form of the valve disks used in the spool valve illustrated in FIG. 2.

In a preferred embodiment, the spool valve includes a tubular housing 52 through which the inlet 40, outlets 42,44 and routing ports 48,50 extend radially in flow communication with a tubular center bore. A straight valve shaft 54 is disposed inside the bore and includes a plurality of valve spools or disks 56 axially spaced apart from each other for suitably routing the water to and from the first and second ports 28,30 of the dose housing. Each of the disks 56 has an outer diameter sized to form a sliding seal fit with the bore diameter, and may include a sealing O-ring as shown in FIG. 3.

Spool valves are conventional for providing alternate routing paths therethrough for channeling fluid, with the different routing paths being determined by the relative spacing between the disks and the placement of the flow passages through the spool housing wall. The spool valve illustrated in FIG. 2 is configured in accordance with the present invention for primarily providing alternate routing paths from the water inlet 40 to the first and second ports 28,30 of the dose housing for alternately discharging water doses through the discharge line 22 to the ice tray.

Accordingly, the spool valve 34 is preferably configured to alternately route water to the first and second ports 28,30 in sequence, and correspondingly route the water being emptied from the dose chambers to the common water outlet 42 for flow to the icemaker.

Figure 2:
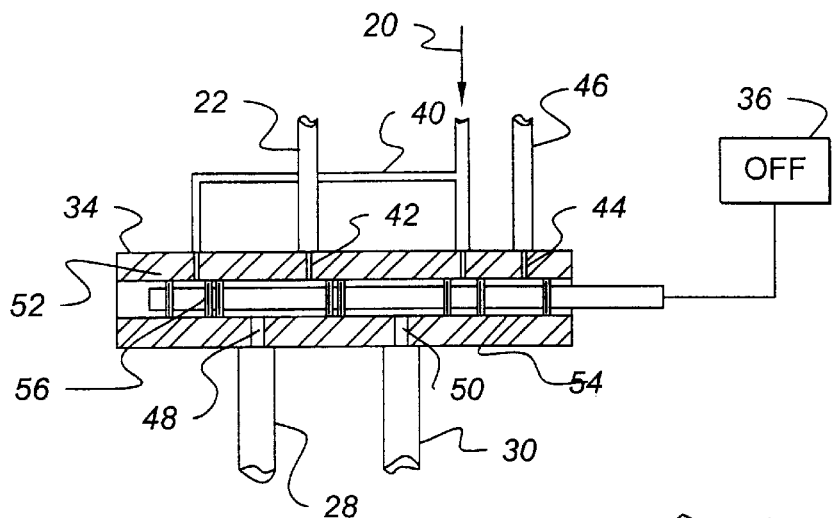
FIG. 2 is a partly sectional elevational view through a routing spool valve cooperating with the dose dispenser illustrated in FIG. 1 shown in an off position.

As shown in FIGS. 1 and 2, the actuator 36 is operatively joined to the valve shaft 54 for selectively changing its linear position therein and correspondingly positioning the several disk 56 for alternately routing the water to and from the first and second ports 28,30 during operation.

In the exemplary embodiment illustrated in FIG. 2, two end disks 56 are provided at opposite ends of the shaft to seal and bound the several routing paths therebetween. And, three pairs of disks are suitably spaced axially therebetween.

In FIG. 2, the actuator 36 positions the valve shaft 54 at an off position in which respective ones of the disks 56 cooperate with the inlet 40 to prevent water flow therefrom.

Figure 4:
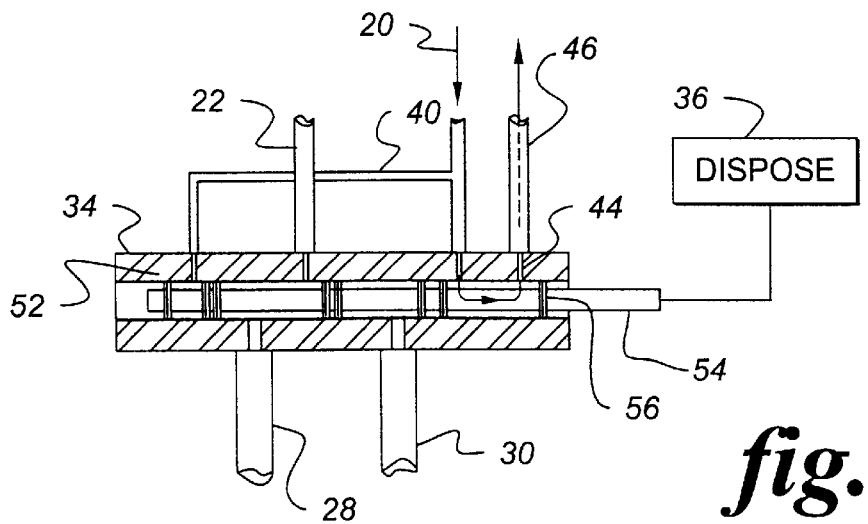
FIG. 4 is a partly sectional view of the spool valve illustrated in FIG. 1 in a water dispensing position.

FIG. 4 illustrates an optional routing path where the actuator 36 positions the valve shaft 54 left relative to the FIG. 2 position which provides a routing path to the dispenser outlet 44. The spool valve 34 preferably includes two water inlets 40, a left and right inlet as illustrated in FIG. 4 branching off from a common supply line. The right inlet is located adjacent to the dispensing outlet 44 so that a pair of the disks 56 correspondingly straddle the two access holes for providing a routing path from the right inlet to the dispensing outlet 44. This routing path is optional and does not affect performance of the dose dispenser itself, except that it may be incorporated in the cooperating spool valve.

In FIG. 4, the remaining disks isolate the first and second ports 28,30 from the two water inlets as water is dispensed through the auxiliary outlet 44.

Figure 5:
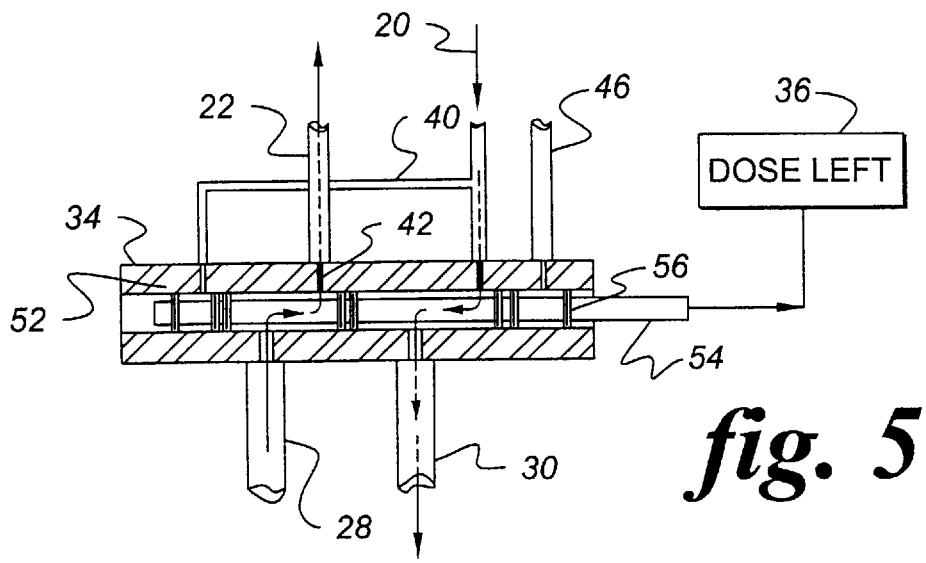
FIG. 5 is a partly sectional view of the spool valve illustrated in FIG. 1 in one position for dispensing a water dose from the left chamber of the dispensing housing.
Figure 6:
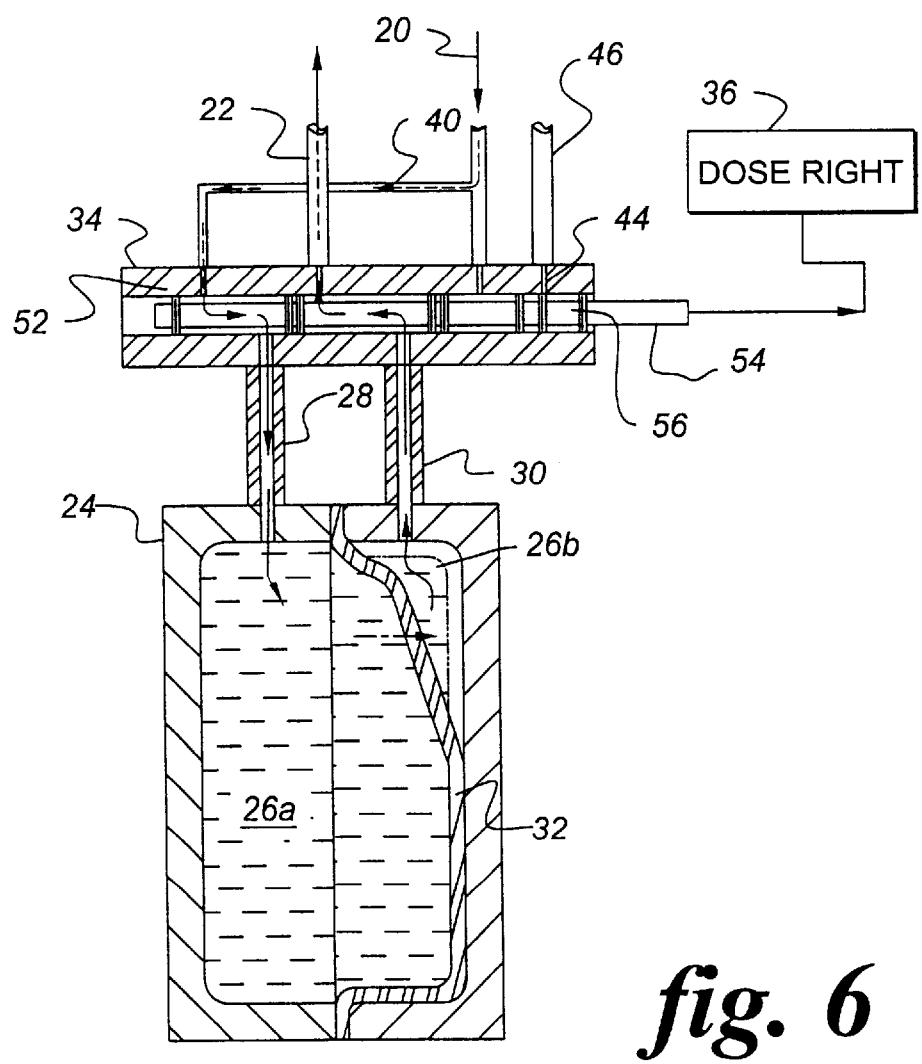
FIG. 6 is a partly sectional view of the spool valve illustrated in FIG. 1 in another position for dispensing a water dose from the right chamber of the dispenser housing.

FIGS. 5 and 6 illustrate the corresponding routing paths through the spool valve for alternately cycling the dose dispenser. In FIG. 5, the actuator 36 positions the valve shaft 54 to the right relative to the FIG. 2 off position and corresponds with dispensing a dose of water from the left chamber 26a illustrated in FIG. 1. As shown in FIG. 5, an inlet routing path between the fifth and sixth disks 56 is created between the right inlet 40 and the second port 30 for filling the right chamber 26b illustrated in FIG. 1 with water which simultaneously displaces the septum 32 to the left to empty the left chamber 26a. Water from the left chamber is discharged through the first port 28 and is channeled through another routing path between the third and fourth disks illustrated in FIG. 5 for discharge through the dose outlet 42 joined to the discharge line 22.

In FIG. 6, the actuator 36 further moves the valve shaft 54 to the right relative to FIG. 5 to provide a routing path from the left inlet 40 between the first and second disks 56 in flow communication with the first port 28 for filling the left chamber 26a with water, which in turn displaces the septum to the right for emptying the second chamber 26b through the second port 30. Another routing path is defined between the third and fourth disks for permitting discharge of the water from the second port 30 to the common water outlet 42 and discharge line 22.

By operating the actuator 36 in FIGS. 5 and 6 to alternately position the valve shaft 54, water is routed from the inlet 40 alternately to the left and right chambers 26a,b which in turn empty water from the chamber on the opposite side of the septum which is discharged through the common outlet 42 and discharge line 22 for accurately filling the ice tray with water.

In FIGS. 5 and 6, the dispensing outlet 46 is isolated from water flow by the sixth and seventh disks 56. And, in the off position illustrated in FIG. 2, the two ports 28,30 are also isolated from the inlet water and therefore interrupt pressure to the dose housing and reduce the possibility of water leakage therefrom.

The primary component of the dose dispenser 18 is the specifically configured housing 24 bifurcated by the septum 32 illustrated in FIG. 1. By alternately filling the left and right chambers 26a,b, precise volumes of water may be discharged to the ice tray 16 in either a single cycle dose, or preferably a plurality of cycles of small doses. Accordingly, the dose housing 24 may cooperate with any suitable valve for alternately filling and emptying the two chambers 26a,b, with the spool valve 34 being a preferred embodiment.

The actuator 36 illustrated in FIG. 1 may also have any suitable form for axially positioning the valve shaft 54 as desired for effecting the various routing paths in the spool valve itself.

In the preferred embodiment, the actuator 36 is a conventional linear stepping motor 36a operatively joined to the valve shaft 54 for axially stepping the position thereof. Stepping motors are conventional and may be controlled for accurately positioning the valve shaft 54 by simply counting the number of steps effected by the motor, which therefore eliminates the need for any position sensor in the valve spool. Furthermore, the motor may be relatively small and low powered and therefore requires relatively little electrical current which minimizes dissipation of undesirable heat within the cabinet of the refrigerator.

Alternatively, the actuator 36 may comprise a conventional lead screw motor 36b in which a motor drives a lead screw for axially positioning the valve shaft 54. Both motors 36a,b are preferably direct current motors for minimizing size and electrical current requirements.

The actuator 36 may also be in the form of one or more electrical solenoids 36c mounted to one or both ends of the valve shaft 54 for controlling its axial position. Solenoids are conventional in icemakers for timed admission of water to the ice tray, but timed admission is undesirable due to variation in water pressure, and solenoids require more electrical current than motors and therefore dissipate more undesirable heat therefrom.

As illustrated in FIGS. 1 and 6, the dose dispenser provides a simple measuring reservoir for accurately dispensing water doses to the icemaker without affect by water pressure. As long as the reservoir is completely filled with water in each cycle of operation, an accurate dose of water is dispensed to the icemaker.

Figure 7:
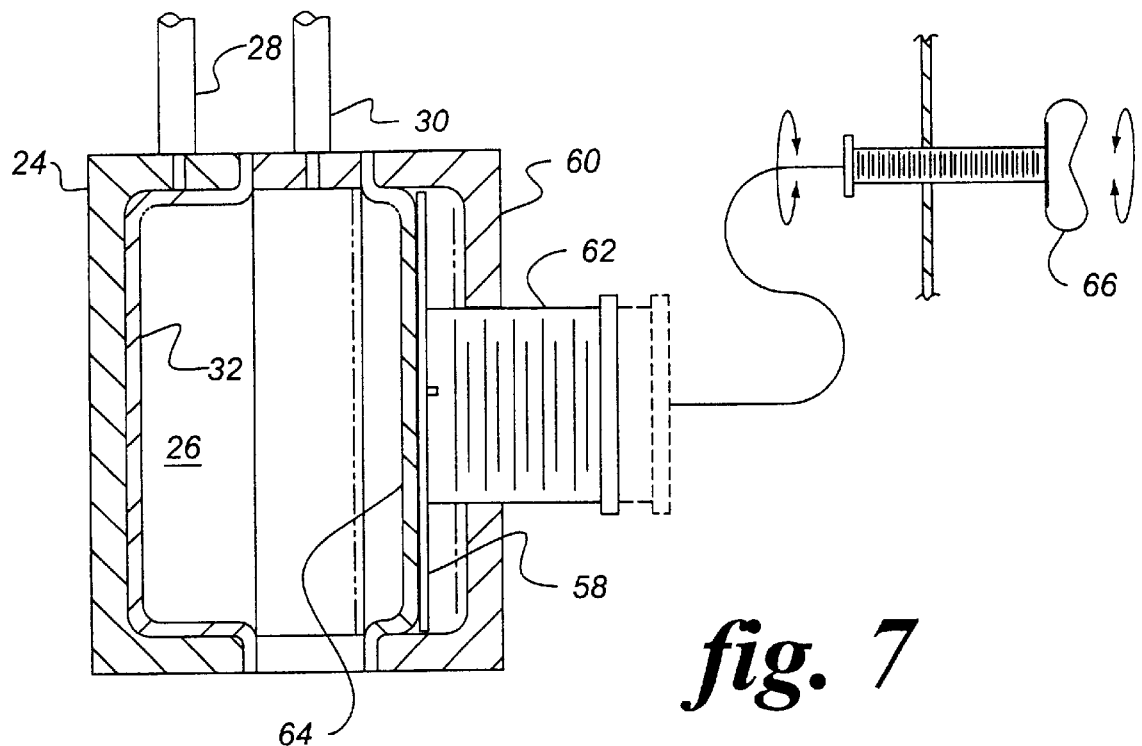
FIG. 7 is partly sectional, elevational view of the dose housing in accordance with another embodiment of the present invention.

Illustrated in FIG. 7 is an alternate embodiment of the dose housing 24 including means in the exemplary form of a baffle 58 disposed inside the housing for manually varying volume of the reservoir 26 to adjust dose of the water dispensed through the ports 28,30.

By adjustably spacing the baffle 58 between the septum 32 and an opposite endwall 60 of the housing, the volume of the reservoir 26 in which the septum 32 may oscillate correspondingly varies. By alternately supplying water to the ports 28,30, the reservoir 26 is filled to the boundary provided by the baffle 58 for adjusting its volume and correspondingly adjusting size of the ice cubes formed in the ice tray.

In the exemplary embodiment illustrated in FIG. 7, the baffle 58 is suitably joined to the end of a lead screw 62 threadingly extending through the endwall 60. By turning the screw 62 in or out relative to the endwall 60, the baffle 58 attached to the distal end thereof is correspondingly spaced from the endwall inside the reservoir. In this way, the volume of the reservoir 26 may be reduced as a baffle 58 is displaced away from the endwall 60.

In order to provide an effective fluid tight housing 24, a sealing membrane 64 may be fixedly mounted to the housing 24 to adjoin the baffle 58. The membrane 64 may be a thin sheet of silicone rubber, like the septum 32, for conforming to the axial position of the baffle 58 and providing an effective seal therearound to prevent water leakage past the screw 62.

Since the dose housing 24 will typically be hidden within the refrigerator cabinet where space permits, the lead screw 62 is preferably joined by a suitable flexible cable to a remotely located screw knob 66 for convenient access by the user. By simply turning the knob 66, the lead screw 62 correspondingly turns for changing the axial position of the baffle 58 and correspondingly changing the volume of the reservoir 26 for adjusting ice cube size.

Figure 8:
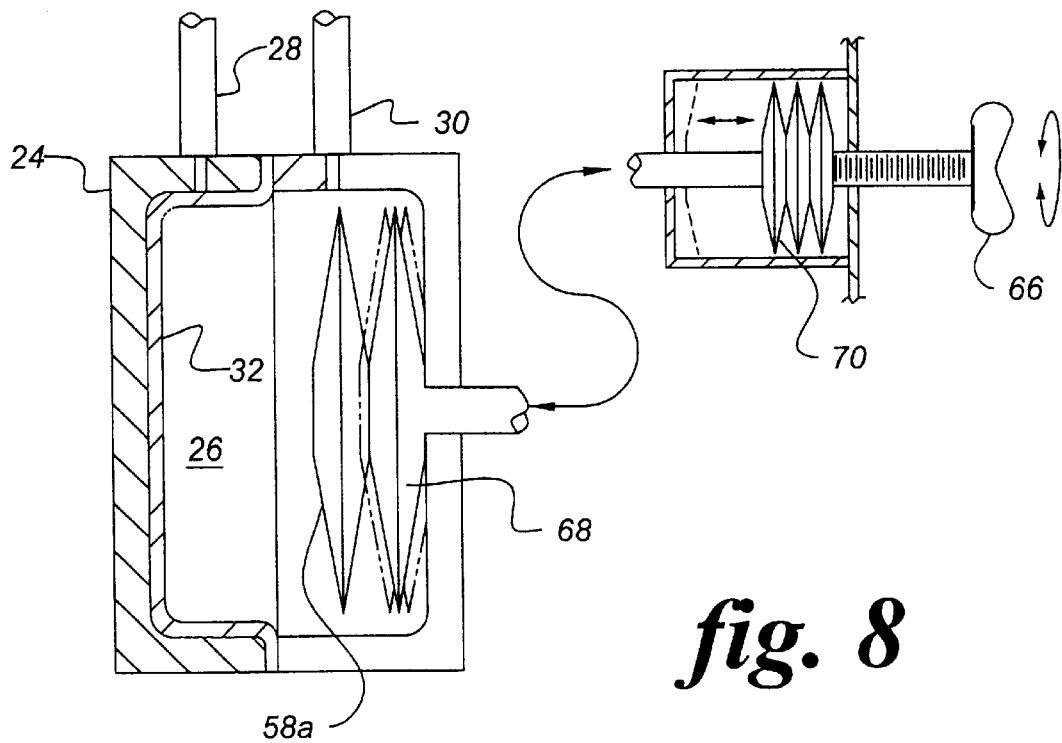
FIG. 8 is a partly sectional, elevational view of the dose housing in accordance with another embodiment of the present invention.

FIG. 8 illustrates an alternate configuration of the dose housing 24 for adjusting the volume of the reservoir 26. In this embodiment, an adjustable main expansion bellows 68 is disposed inside the reservoir 26 with the baffle 58a forming an exposed endwall thereof. The main bellows 68 is operatively joined by a fluid conduit to a remote bellows 70 conveniently accessible to the user. Another one of the screw knobs 66 may be operatively joined with the remote bellows 70 for adjusting the compression or expansion thereof.

The main and remote bellows 68,70 are filled with a suitable incompressible fluid, such as water, so that compression of the remote bellows 70 expands the main bellows 68 inside the reservoir 26 for reducing the available volume therein. The bellows are inherently resilient so that the main bellows 68 automatically collapses as pressure is released therefrom as the screw knob 66 is withdrawn.

In this exemplary embodiments disclosed above, the septum 32 provides a convenient mechanism to bifurcate the dose housing 24 into two chambers which are alternately filled with water and emptied as the septum is displaced back and forth inside the reservoir. Since the septum is preferably flexible it conforms to the inner surface of the reservoir when either one of the two chambers is filled with water for accurately controlling the volume of each water dose.

Figure 9:
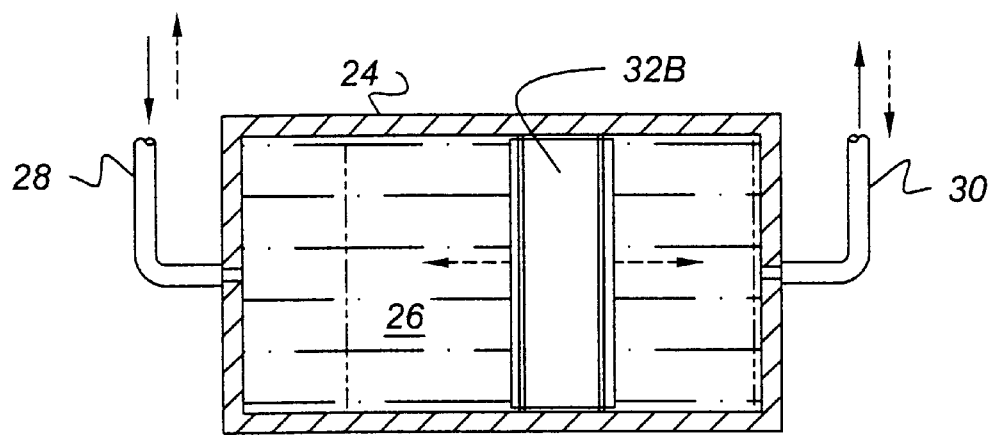
FIG. 9 is a partly sectional, elevational view of the dose housing in accordance with another embodiment of the present invention.

FIG. 9 illustrated an alternate embodiment of the present invention wherein the septum is not flexible but is in the form of a rigid cylindrical piston 32B slidably disposed inside the tubular reservoir 26 for reciprocation movement between the opposite endwalls thereof. The piston septum 32B may be made of suitable material, such as plastic or metal, and has an outer diameter closely matching the diameter of the reservoir 26 for providing an effective seal therewith. The piston may include perimeter O-rings for enhancing sealing if desired.

In operation, the piston 32B operates similarly to the flexible septum of the previous embodiment with the water being alternately supplied through the two ports 28,30 on opposite sides of the piston, and being emptied from the reservoir on the corresponding opposite side of the piston as it is driven back and forth through the housing.

Figure 10:
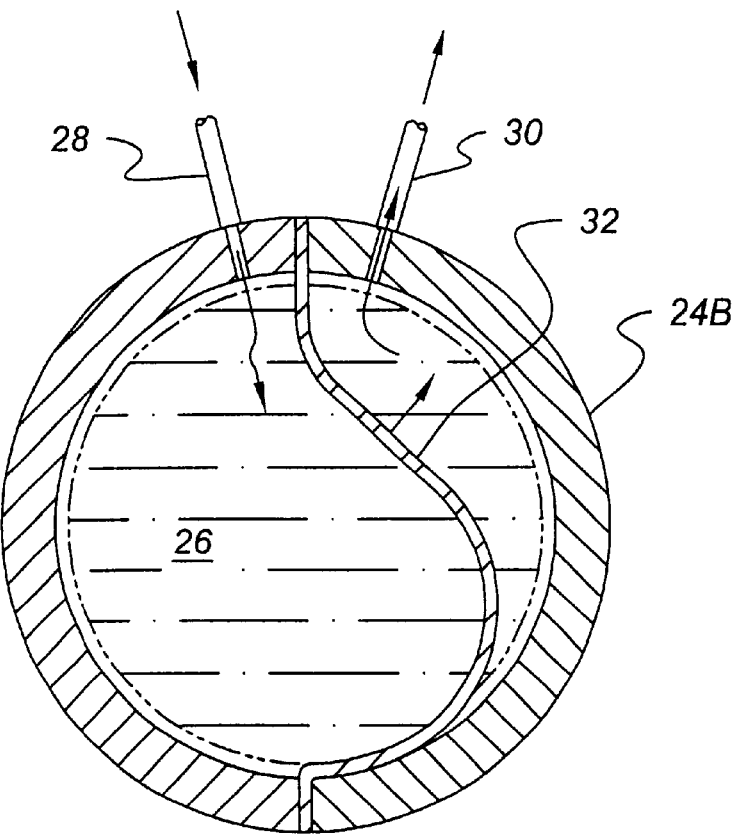
FIG. 10 is a partly sectional, elevational view of the dose housing in accordance with another embodiment of the present invention.

FIG. 10 illustrates yet another embodiment wherein the housing 24B is a hollow sphere cooperating with the annular flexible septum 32 suitably mounted therein. In this embodiment, no corners are found in the reservoir 26 and the septum 32 readily conforms to the semi-spherical opposite sides of the reservoir as it reciprocates back and forth for dispensing the water doses. The spherical configuration illustrated in FIG. 10 maximizes reservoir volume in a compact space and improves conformity between the flexible septum and the arcuate inner surface of the spherical housing.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. An icemaker dose dispenser comprising:
   a housing having an internal reservoir, and first and second spaced apart ports for channeling water; and
   a septum disposed in said reservoir between said ports for sealingly dividing said reservoir into first and second chambers on opposite sides thereof, and being movable therein for inversely changing volume of said chambers available for holding said water.

2. A dispenser according to claim 1 further comprising means for alternately supplying water to said ports for correspondingly filling and emptying said chambers in turn.

3. A method of using said dispenser according to claim 2 to fill an ice tray of said icemaker, comprising:
   alternately supplying water to said ports for correspondingly filling one chamber and moving said septum to empty an opposite chamber; and
   channeling water from said chamber being emptied to said ice tray.

4. A method according to claim 3 further comprising alternately supplying water to said ports to correspondingly reciprocate said septum in a plurality of cycles to fill said ice tray with water.

5. A dispenser according to claim 2 wherein said reservoir is smaller in volume than an ice tray of said icemaker, and said water supplying means are configured to repetitively fill and empty said chambers to fill said ice tray with water.

6. A dispenser according to claim 2 wherein said reservoir is tubular, and said septum comprises a piston slidably disposed therein for reciprocation movement between opposite ends thereof.

7. A dispenser according to claim 2 wherein said septum comprises a flexible membrane.

8. A dispenser according to claim 7 wherein said reservoir is annular, and said septum is a disk.

9. A dispenser according to claim 7 wherein said septum is mounted to bifurcate said reservoir, and is sized to line in abutment said empty chamber under pressure from said filled chamber.

10. A dispenser according to claim 2 further comprising means for varying volume of said reservoir to adjust dose of said water dispensed through said ports.

11. A method of using said dispenser according to claim 10 to fill an ice tray of said icemaker, comprising:

varying volume of said reservoir; and alternately supplying water to said ports and correspondingly emptying water from said reservoir to fill said ice tray and adjust size of ice cubes formed therein.

12. A dispenser according to claim 10 wherein said volume varying means comprise a baffle disposed in said reservoir and adjustably spaced between said septum and an opposite endwall thereof.

13. A dispenser according to claim 12 wherein said volume varying means further comprise a screw extending through said endwall and joined to said baffle for adjusting position of said baffle from said endwall.

14. A dispenser according to claim 12 wherein said volume varying means further comprise an adjustable bellows disposed inside said reservoir, with said baffle forming an endwall thereof.

15. A dispenser according to claim 2 wherein said water supplying means comprise:

a spool valve having a water inlet, a dose outlet, and two routing ports joined in flow communication with respective ones of said first and second housing ports; and said spool valve is configured to alternately route water to said first and second ports in sequence, and correspondingly route water being emptied from said chambers to said water outlet for flow to said icemaker.

16. A dispenser according to claim 15 wherein said spool valve further comprises:

a tubular housing containing said inlet, outlet, and routing ports; and a valve shaft disposed therein, with a plurality of valve disks axially spaced apart thereon for routing said water to and from said first and second ports.

17. A dispenser according to claim 16 wherein said water supplying means further comprise an actuator for axially positioning said valve shaft in said housing for alternately routing water to and from said first and second ports.

18. A dispenser according to claim 17 wherein said actuator comprises a linear stepping motor operatively joined to said valve shaft for axially stepping position thereof.

19. A dispenser according to claim 17 wherein said spool valve housing further includes a second outlet for dispensing drinking water through a separate dispensing line, and cooperates with said valve disks to isolate said first and second ports from said inlet.

20. An icemaker dose dispenser comprising:

a housing with a reciprocating septum therein defining first and second opposite chambers having corresponding first and second ports; and means for routing water alternately through said first and second ports for dispensing water from said chambers in sequence.

21. A dispenser according to claim 20 wherein:

said septum comprises a flexible membrane bifurcating said housing; and said routing means comprise a spool valve having alternate routing paths therethrough for channeling water alternately to and from said first and second ports.

* * * * *